US005554015A

United States Patent [19]

Dreiman et al.

[11] Patent Number: 5,554,015
[45] Date of Patent: Sep. 10, 1996

[54] REFRIGERATION COMPRESSOR THRUST BEARING ASSEMBLY

[75] Inventors: Nelik I. Dreiman, Tipton; Tara C. Kandpal, Tecumseh, both of Mich.

[73] Assignee: Tecumseh Products Company, Tecumseh, Mich.

[21] Appl. No.: 448,198

[22] Filed: May 23, 1995

[51] Int. Cl.$^6$ ............................................. F04B 35/04
[52] U.S. Cl. .......................... 417/415; 417/902; 384/909; 384/368
[58] Field of Search ............................ 417/415, 902; 384/368, 371, 909

[56] References Cited

U.S. PATENT DOCUMENTS

| | | | |
|---|---|---|---|
| 1,591,361 | 7/1926 | Church | 384/368 |
| 1,786,565 | 12/1930 | Freeman | 384/368 |
| 2,287,203 | 6/1942 | Smith | 417/415 X |
| 2,312,596 | 3/1943 | Smith . | |
| 3,635,535 | 1/1972 | Schultenkamper . | |
| 4,244,456 | 1/1981 | Loker . | |
| 4,308,225 | 12/1981 | Magarian . | |
| 4,371,220 | 2/1983 | Brucher | 384/371 |
| 4,386,859 | 6/1983 | Andrione . | |
| 4,533,262 | 8/1985 | Pedersen . | |
| 4,795,220 | 1/1989 | Mori . | |
| 4,881,879 | 11/1981 | Ortiz | 417/902 X |
| 5,160,247 | 11/1992 | Kandpal . | |

Primary Examiner—Richard E. Gluck
Attorney, Agent, or Firm—Baker & Daniels

[57] ABSTRACT

A refrigeration compressor includes a polyamide annular thrust bearing pressfit within a countersunk recess in the rotor aperture and having radially extending lubricating oil grooves on a lower surface thereof. A vertical crankshaft being concentrically disposed within and secured to the rotor at one end and being journalled for rotation within a vertical bore defined by a bearing hub formed in a frame. The bearing hub supports the rotor and crankshaft combination. The bearing hub includes an upper end face which is machine ground and polished to a smooth surface and which is in contact with the smooth lower surface of the thrust bearing thereby forming a frictional pair. A reduction in mechanical friction and power consumption is realized by use of the polyamide thrust bearing and the smooth polishing of the hub upper end face thereby increasing the overall efficiency associated with the refrigeration compressor.

18 Claims, 3 Drawing Sheets

REFRIGERATION COMPRESSOR THRUST BEARING ASSEMBLY

BACKGROUND OF THE INVENTION

The present invention relates generally to hermetic refrigeration compressors and especially low capacity refrigeration compressors used in household appliances. More particularly, the invention relates to thrust bearing assemblies for supporting vertical rotor and crankshaft combinations commonly associated with refrigeration compressors. An area of concern long associated with such compressors, as well as other machines, is the amount of mechanical friction that occurs within the compressor during operation. Compressor efficiency is quantified as an energy efficiency ratio (EER), which is derived by dividing the compressor output in BTU/hour by the power consumed by the compressor under standard operating conditions. According to this relationship, it becomes apparent that one way of increasing the efficiency of a compressor is to decrease the amount of power consumed by the compressor without adversely affecting its BTU output.

One source of power consumption within the compressor is the mechanical friction between the bearing frame hub and the rotating rotor and crankshaft combination. Many types of thrust bearings have been used to diminish mechanical friction and thereby reduce the power consumed by a compressor. Thrust bearings of the past have been machined steel, plain or oil film type, multi-layered, a composite of materials, or a ball bearing assembly to name a few. Problems associated with prior art thrust bearings include the following: warpage of copper and copper alloy bearings; expense associated with metallic, alloy materials, multi-layered bearings, and ball bearing assemblies; and complexities in manufacturing associated with ball bearing assemblies.

In particular, ball bearing type thrust bearings employ a pair of flat thrust washers which serve as races between which balls are mounted in a plastic cage. In general, ball type bearings require a lower starting torque than the fluid film type bearings. However, once running under hydrodynamic film, the fluid film type bearings exhibit friction characteristics comparable to those of ball type bearings.

One of the disadvantages of the ball type bearing is the necessity to use through-hardened acid-corrosion resistant metal for the rolling elements and flat thrust washers. The plastic material used for fabricating the bearings cage is sensitive to temperature and has a lower continuous service temperature than the metal balls and thrust washers.

Another disadvantage is the requirement for multiple parts (balls, cage, bearing, and two washers) which increases production costs and results in additional frictional pairs. In addition, ball type bearings produce greater noise than fluid film type bearings.

SUMMARY OF THE INVENTION

According to the present invention, the mechanical friction associated with a vertical rotor and crankshaft combination as it rests upon and rotates about the frame bearing hub is reduced both at startup and during compressor operation by utilizing a thrust bearing formed of a polyamide material. By pressfitting the thrust bearing within the counterbore formed in the rotor, rotation of the thrust bearing relative to the rotor is prevented. This results in rotational contact between a single frictional pair, the lower surface of the thrust bearing against the upper end face of the bearing hub, thereby reducing the amount of mechanical friction within the compressor. By reducing the friction caused by the radial reaction of the crankshaft at compressor startup and during operation, the present invention increases overall compressor efficiency.

The polyamide material used to form the thrust bearing of the present invention is characterized by a very low coefficient of static and kinetic friction. This results in reduced mechanical friction and reduced power consumption associated with starting and operating the compressor. Another beneficial characteristic associated with polyamide is its broad temperature range thermal stability. Even unlubricated polyamide thrust bearings are capable of withstanding approximately 300,000 lb.ft./in. min. with a maximum contact temperature of 740° F. Lubricating oil is delivered by the crankshaft to the thrust bearing surface, thereby further reducing the coefficient of friction during compressor operation. Properly lubricated polyamide thrust bearings can withstand approximately 1 million KPSI feet/minute. A plurality of radially extending grooves are provided in the thrust bearing surface, thereby enhancing the delivery of lubricating oil to the bearing/hub contact area.

In the preferred embodiment, the end face of the bearing hub is machine ground to a smooth finish and a fine polishing operation is applied, thereby further reducing the coefficient of friction between the hub and the thrust bearing surface. While the surface finish is not critical, it does have an effect on performance. The smoother the surface, the better the performance.

Therefore, one advantage of the present invention is a reduction in the coefficients of static and kinetic friction associated with the compressor thrust bearing, which results in reduced power consumption and increased overall compressor efficiency.

Another advantage of the present invention is a reduction in the costs associated with traditional bearing assemblies by using a pressfit installation and single piece construction of the polyamide thrust bearing.

Yet additional advantages of the present invention are: vibration dampening, lack of corrosion, broad temperature range thermal stability, and superior chemical and abrasion resistance.

In one embodiment, the refrigeration compressor of the present invention consists of a housing, a support block, a motor, a crankshaft and an annular thrust bearing device. The support block includes a bearing hub having an upper end face and defining a vertical bore. The motor consists of a concentric stator and rotor assembly wherein the rotor has an inner aperture which receives the crankshaft and an outer aperture which has an inner wall. The stator surrounds the rotor and is mounted to the support block. The crankshaft is secured concentrically to the rotor and extends through the vertical bore of the bearing hub. The annular thrust bearing device is pressfit within the rotor outer aperture so that with the crankshaft disposed in the bearing hub vertical bore, the thrust bearing engages the upper end face of the bearing hub. The thrust bearing is characterized by a smooth lower bearing surface having a low coefficient of friction. Radially extending grooves are provided in the thrust bearing lower surface for communicating lubricating oil between the thrust bearing device and the upper end face of the bearing hub. The upper end face of the bearing hub is machine ground to a smooth surface for further reducing the coefficient of friction between the frictional pair.

In the preferred embodiment, the polyamide thrust bearing is formed of Torlon as produced by Amoco or Vespel as produced by DuPont. The PV limits, defined as the product of load or pressure (P) and sliding velocity (V), associated with the unlubricated Vespel bearing material under continuous motion is 300,000 lb.ft/in min. with a maximum contact temperature of 740° F. (393° C.) vastly exceeding the limits of unfilled nylon.

BRIEF DESCRIPTION OF THE DRAWINGS

The above-mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. The exemplifications set out herein illustrate a preferred embodiment of the invention, in one form, and such exemplifications are not to be construed as limiting the scope of the invention in any manner.

DETAILED DESCRIPTION OF THE INVENTION

Figure 1:
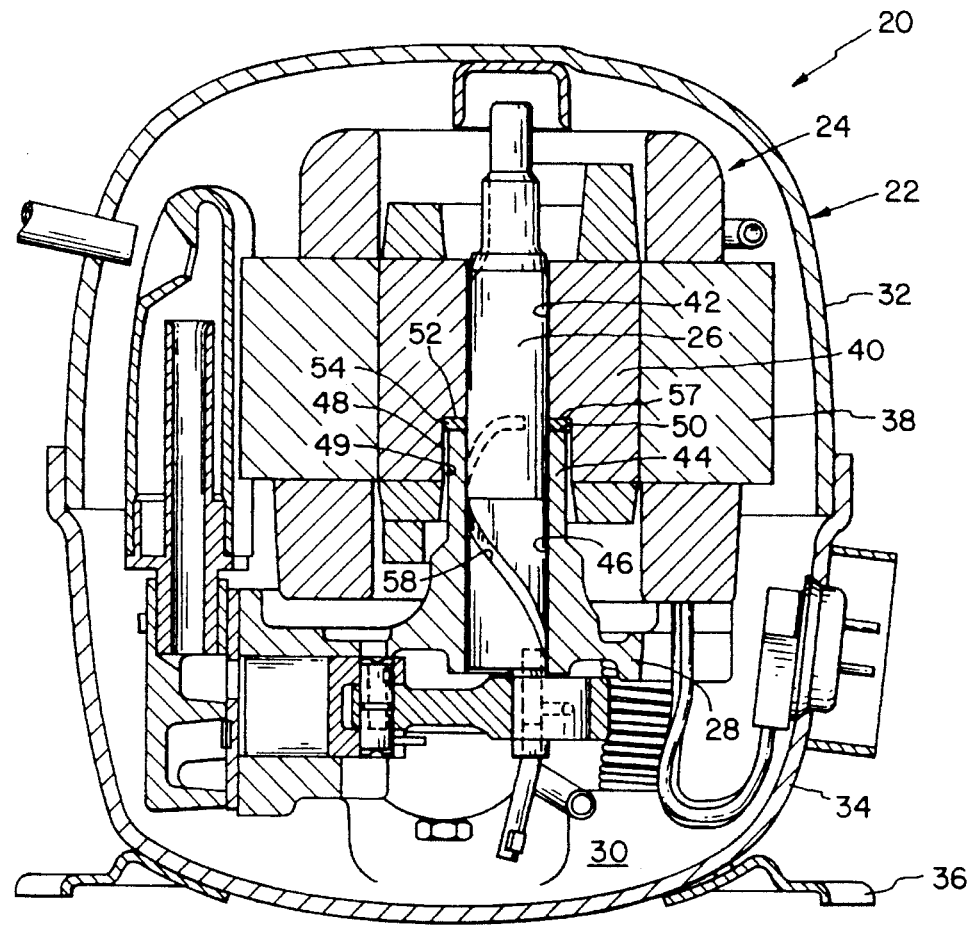
FIG. 1 is a cross-sectional view of one embodiment of the refrigeration compressor of the present invention.

Referring now to the drawings and particularly to FIG. 1, reciprocating compressor 20 is shown in one embodiment which is only provided as an example of a type of compressor in which the present invention thrust bearing may be implemented. As the thrust bearing of the present invention may be utilized in numerous and varied compressor configurations, the invention is not limited to the compressor illustrated in FIG. 1.

U.S. Pat. No. 5,160,247, issued to the assignee of the present invention and incorporated herein by reference, provides a detailed description of the operation of a refrigeration compressor which is compatible with the present invention.

Refrigeration compressor 20 generally includes housing or shell 22, motor 24, crankshaft 26, frame 28 and oil sump 30. Housing 22 consists of upper housing portion 32 and lower housing portion 34 which are hermetically secured to one another by welding or brazing. Mounting flange 36 is welded to the bottom of lower housing portion 34 for mounting the compressor in a stable position. Motor 24 consists of stator 38, which is secured to frame 28, and rotor 40, which is provided with bore 42 into which is secured crankshaft 26 by means of an interference fit. The weight of the rotor and crankshaft combination is generally supported by frame 28. Extending upwards from frame 28 is bearing hub 44, the center of which defines vertical bearing bore 46. Crankshaft 26 is journalled for rotation within vertical bearing bore 46. Countersunk recess 48 is provided in the lower portion of rotor 40 so that the rotor is disposed about bearing hub 44 with crankshaft 26 journalled in vertical bearing bore 46. The weight of the rotor and crankshaft combination is born directly by bearing hub 44 at upper end face 50.

Figure 2:
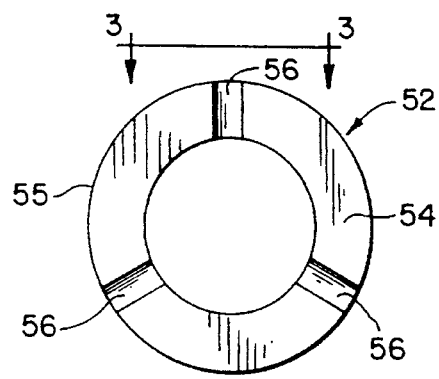
FIG. 2 is a bottom view of the thrust bearing for use in the compressor of the present invention.
Figure 4:
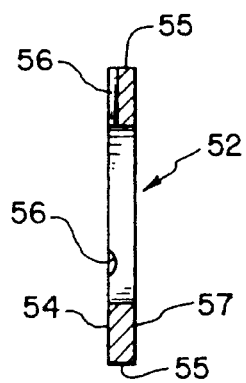
FIG. 4 is a cross-sectional view of the thrust bearing of FIG. 2.
Figure 3:
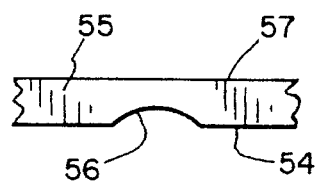
FIG. 3 is an enlarged fragmentary side view of the thrust bearing of FIG. 2 showing a lubricating oil groove formed therein viewed in the direction of arrows 3—3 in FIG. 2.
Figure 5:
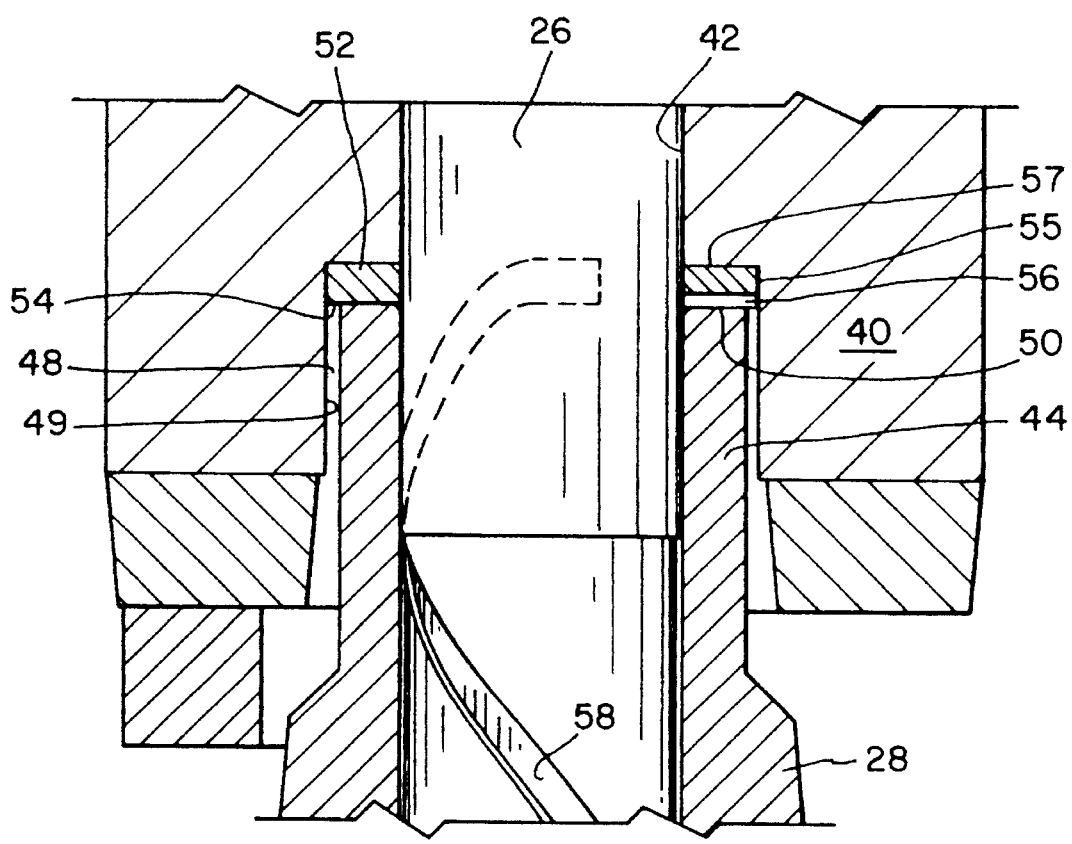
FIG. 5 is a partial cross-sectional view showing the crankshaft, rotor, bearing hub, and thrust bearing of the refrigeration compressor of FIG. 1.

Thrust bearing device 52 is formed of a solid lubricant-filled plastic material comprising particulate graphite containing polyamide resin, such as "Vespel" as manufactured by DuPont Corporation, or a suitable aramid plastic, such as "Torlon" as manufactured by Amoco, Inc. Thrust bearing 52 consists of lower surface 54, outer annular wall 55, grooved channels 56, and upper surface 57. Smooth lower surface 54 is characterized by low coefficients of static and kinetic friction. Grooved channels 56 extend radially across lower surface 54 and communicate oil to lubricate lower surface 54 and hub upper end face 50. FIGS. 2 and 4 illustrate thrust bearing 52 in one particular embodiment in which there are three grooves 56 which are equally radially spaced 120° apart on lower surface 54. The invention is not limited to this configuration and extends to permutations thereof. Grooves 56 serve to communicate lubricating oil to the contact surface between lower surface 54 and upper end face 50. While FIG. 3 illustrates grooves 56 as having a curved shape, the scope of the invention is not limited to a particular shape and extends to include any shape and configuration that will adequately supply lubricating oil to the contact surface. With particular reference to FIG. 5, outer annular wall 55 extends vertically from the outer perimeter of lower surface 54 and upper surface 57 and, upon being pressfit in aperture 48 of rotor 40, engages inner wall 49 so as to prevent rotational movement of thrust bearing 52 relative to rotor 40. As shown in FIG. 5, lubricating oil is delivered to grooved channels 56 by cam shaft spiral groove 58 which communicates oil collected in oil sump 30. In this manner, mechanical friction occurring during compressor operation is reduced.

By pressfitting thrust bearing 52 into aperture 48 of rotor 40 and preventing the rotation of thrust bearing 52 relative to rotor 40, only one frictional pair, that of lower surface 54 against hub upper end face 50, will incur rotational sliding contact. In a preferred embodiment, hub upper end face 50 is machine ground to a smooth surface, this is preferable over a turned surface. Hub upper end 50 may be finely polished for additional smoothness and lower surface 54 of thrust bearing 52 may be manufactured having a finish of 20 microinches, but having a finish smoothness of at least 63 microinches. In this manner the mechanical friction associated with compressor startup and operation is reduced, thereby increasing overall compressor operating efficiency.

Figure 6:
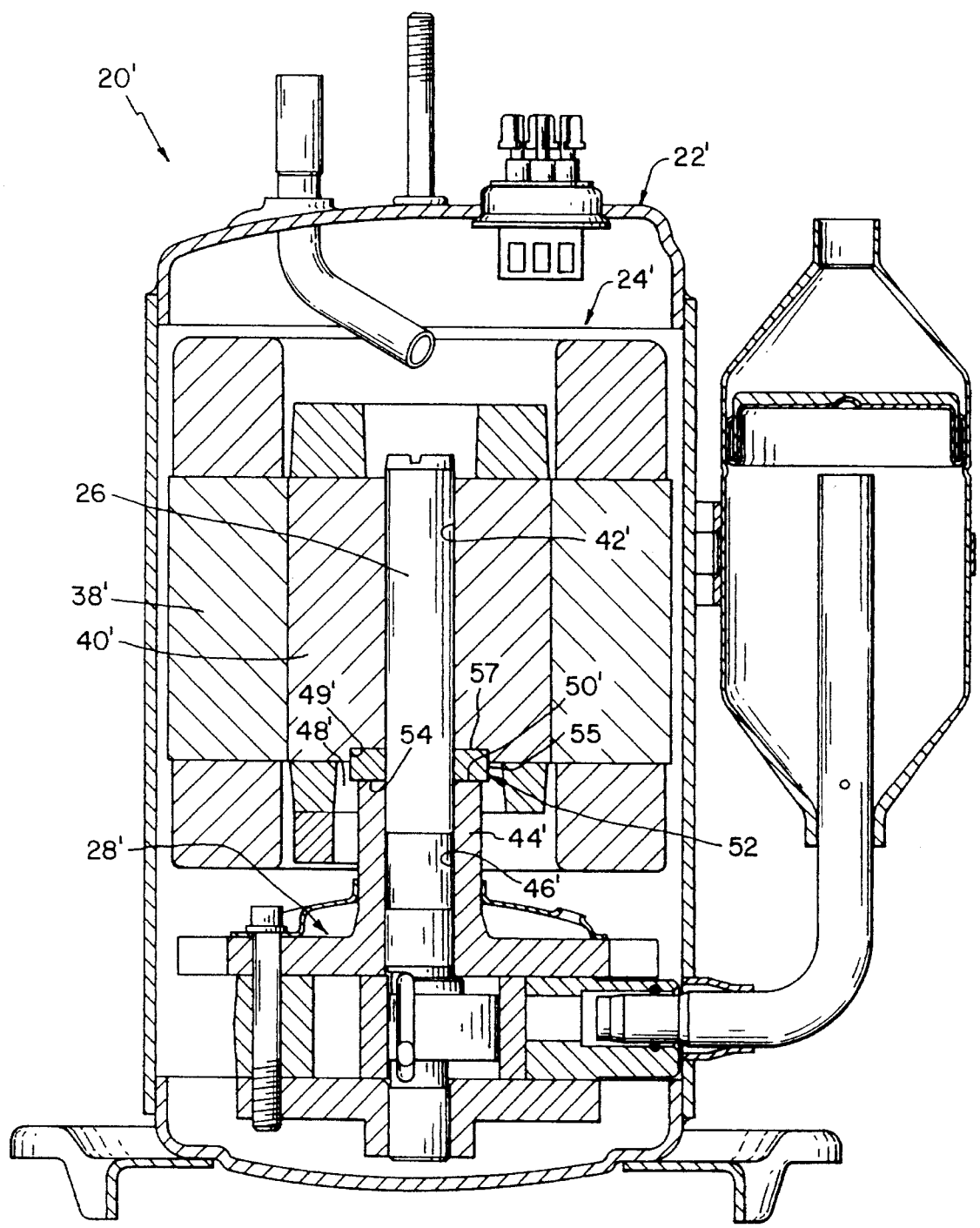
FIG. 6 is a cross-sectional view of a second embodiment of the compressor of the present invention.

FIG. 6 illustrates the present invention in a second embodiment in which thrust bearing 52 is utilized in rotary type compressor 20'. Thrust bearing 52 is configured as shown in FIGS. 2, 3, and 4 and as described above. Bearing 52 is pressfit into aperture 48' such that bearing outer annular wall 55 engages with rotor inner wall 49' thereby preventing the rotation of the bearing relative to rotor 40'. Accordingly, only one frictional pair, that of lower surface 54 against hub upper end face 50', will incur rotational sliding contact.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this inven-

What is claimed is:

1. A refrigeration compressor comprising:

a housing;

a frame comprising a bearing hub, said bearing hub defining a first vertical bore and having an upper end face, said frame mounted within said housing;

a motor comprising a stator and a rotor, said rotor defining a second bore and a countersunk recess;

a crankshaft received in said recess and secured to said rotor, said crankshaft disposed in said first vertical bore;

a pump unit driven by said crankshaft; and an annular thrust bearing press-fit in said recess and fixed relative said rotor, said thrust bearing comprising a lower annular bearing surface engaging said hub upper end face so as to form a single frictional pair between said rotor, said thrust bearing, and said bearing hub.

2. The compressor of claim 1, wherein said annular thrust bearing is formed from one of a group comprised of polyamides and aramids.

3. The compressor of claim 1, wherein said lower bearing surface is characterized by a smoothness of at least 63 microinches.

4. The compressor of claim 1, wherein said hub upper end face is characterized by a smoothness of at least 63 microinches.

5. The compressor of claim 4, wherein said hub upper end face is characterized by a polished surface having a smoothness of at least 20 microinches.

6. The compressor of claim 1, wherein said lower bearing surface includes a groove for communicating lubricating oil to said frictional pair.

7. The compressor of claim 6, wherein said crankshaft is vertical and delivers lubricating oil to said groove, said groove extending radially on said lower bearing surface.

8. The compressor of claim 7 further comprising three grooves radially spaced 120 degrees apart on said lower bearing surface.

9. The compressor of claim 1, wherein said annular thrust bearing further comprises an annular exterior wall and said rotor recess includes a vertical wall, said thrust bearing exterior wall engaging said vertical wall whereby said thrust bearing is fixedly attached to said rotor.

10. In a refrigeration compressor comprising a motor having a stator and a rotor, a frame having a bearing hub, and a vertical crankshaft, said rotor comprising an inner aperture which receives said vertical crankshaft and a countersunk recess having an inner wall, said vertical crankshaft being secured to said rotor and disposed in said bearing hub, said hub having an upper end face, an annular thrust bearing comprising;

an annular lower bearing surface and an annular upper bearing surface, said lower bearing surface and said hub upper end face engaging one another so as to form a single frictional pair between said rotor, said thrust bearing, and said bearing hub; and an exterior annular wall extending perpendicularly from said lower bearing surface to said upper bearing surface, said thrust bearing being pressfit in said recess whereby said thrust bearing exterior annular wall engages said recess inner wall so as to prohibit rotational movement of said thrust bearing relative to said rotor.

11. The compressor of claim 10, wherein said annular thrust bearing is formed from one of a group comprised of polyamides and aramids.

12. The compressor of claim 10, wherein said lower bearing surface is characterized by a smoothness of at least 63 microinches.

13. The compressor of claim 10, wherein the hub end face is characterized by a smoothness of at least 63 microinches.

14. The compressor of claim 13, wherein the hub end face is characterized by a polished surface having a smoothness of at least 20 microinches.

15. The compressor of claim 10 further comprising a groove formed on said lower bearing surface, said groove adapted to communicate lubricating oil to said frictional pair.

16. The compressor of claim 15, wherein the crankshaft delivers lubricating oil to said thrust bearing, said groove extending radially on said lower bearing surface.

17. The compressor of claim 16 further comprising three grooves radially spaced 120 degrees apart on said lower bearing surface.

18. The compressor of claim 15, wherein said groove is semi-cylindrical.

* * * * *